United States Patent
Mattur et al.

(10) Patent No.: US 7,272,669 B2
(45) Date of Patent: Sep. 18, 2007

(54) PROVIDING COMPATIBILITY WITH BOTH ELECTRICALLY ISOLATED AND NON-ISOLATED MODULES IN AN ETHERNET SYSTEM

(75) Inventors: Dattatri Mattur, Sunnyvale, CA (US); Sam Patel, Tracy, CA (US); Eric Schmidt, Cupertino, CA (US); Niels-Peder Mosegaard Jensen, Mountain View, CA (US)

(73) Assignee: Cisco Technology, Inc., San Jose, CA (US)

( * ) Notice: Subject to any disclaimer, the term of this patent is extended or adjusted under 35 U.S.C. 154(b) by 161 days.

(21) Appl. No.: 10/978,991

(22) Filed: Nov. 1, 2004

(65) Prior Publication Data

US 2006/0075173 A1    Apr. 6, 2006

Related U.S. Application Data

(60) Provisional application No. 60/615,910, filed on Oct. 4, 2004.

(51) Int. Cl.
*G06F 3/00* (2006.01)
(52) U.S. Cl. .......................... 710/16; 700/297
(58) Field of Classification Search ............ 710/15–19, 710/300, 316; 379/307, 413; 324/533; 700/297
See application file for complete search history.

(56) References Cited

U.S. PATENT DOCUMENTS

| 6,535,983 | B1* | 3/2003 | McCormack et al. ....... 713/310 |
| 6,546,494 | B1* | 4/2003 | Jackson et al. ............. 713/300 |
| 6,804,351 | B1* | 10/2004 | Karam ....................... 379/413 |
| 7,002,354 | B1* | 2/2006 | Pannell et al. .............. 324/534 |
| 2004/0146061 | A1* | 7/2004 | Bisceglia et al. ........... 370/419 |
| 2005/0135258 | A1* | 6/2005 | Amrod et al. .............. 370/241 |

OTHER PUBLICATIONS

White Paper on Power Over Ethernet (IEEE 802.3af)- A Radical New Technology, Power-Over-Ethernet- The Perfect Resource, Apr. 2003.*
Impact of Power Over Ethernet (PoE) on Industrial Based Networking, Mark Jackson.*
Power Over Ethernet FAQ, The Power Over Ethernet Pioneers, PowerDsine, 2006.*
Herbold, Jacob, "Navigating the IEEE 802.3af Standard for PoE," Power Electronics.Technology Magazine, Jun. 1, 2004, copyright 2004 PRIMEDIA Business Magazines & Media Inc., retrieved from the Internet: <http://powerelectronics.com/mag/power_navigating_Ieee_af/>.

* cited by examiner

*Primary Examiner*—Khanh Dang
(74) *Attorney, Agent, or Firm*—Charles E. Krueger

(57) ABSTRACT

A system and method for configuring a slot to be compatible with both modules that are compliant with the isolation requirements for power over Ethernet and modules that are not compliant.

10 Claims, 5 Drawing Sheets

PROVIDING COMPATIBILITY WITH BOTH ELECTRICALLY ISOLATED AND NON-ISOLATED MODULES IN AN ETHERNET SYSTEM

RELATED APPLICATIONS

This application claims priority from a provisional application entitled SYSTEM AND METHOD FOR PROVIDING COMPATIBILITY WITH BOTH ELECTRICALLY ISOLATED AND NON-ISOLATED MODULES IN AN ETHERNET SYSTEM, filed Oct. 4, 2004, A/N 60/615,910, which is hereby incorporated by reference for all purposes.

BACKGROUND OF THE INVENTION

Incompatibility between new and existing products is a major problem in many technical disciplines including networking and signal switching. Often new products are developed having increased performance and speed but customers have invested heavily in legacy products.

Incompatibility is a particular problem with routing-platforms. Generally a router includes a chassis which can be rack mounted and has different types of slots into which cards and modules slide into, and also contains basic components such as power supply(s) and fan(s). The modules inserted into the slots are line cards which are the actual printed circuit boards that handle packet data and analog signaling ingress and egress. Line cards provide one or more interfaces over which traffic flows. Thus, depending on the number of slots and interfaces, a router can be configured to work with a variety of networking protocols.

In some cases slots compatible with a new versions of a module are incompatible with legacy modules. One example is where new modules are designed for receiving power in tandem with 10/100/1000 Mbps data according to the Power over Ethernet (PoE) standard (IEEE 802.3af). PoE modules must be isolated from the backplane and are provided with a second connector (−48VRET) coupled to the power supply for −48V return current.

However, a slot designed to received devices utilizing PoE is not compatible with legacy parts that are powered by conventional techniques.

The challenges in the field of communications continue to increase with demands for more and better techniques having greater flexibility and adaptability. Therefore, a need has arisen for a new system and method for providing reconfigurable slots in a router chassis.

BRIEF SUMMARY OF THE INVENTION

In one embodiment of the invention, a module includes identification information that is read when the module is inserted into a slot and prior to power being applied to the module. The identification information is utilized to determine whether the module is compliant with the power over Ethernet isolation requirements. If the module is compliant then current is returned via a −48V return line and the compliant module is isolated from the ground plane. If the module is non-compliant module then current is returned via the ground plane.

In another embodiment of the invention, a relay connects the −48V return line to the ground plane. If a compliant module is inserted the relay is opened to isolate the return line from ground. If a non-compliant module is inserted the relay is closed to couple the −48V return line to the ground plane.

In another embodiment of the invention, the relay is a normally closed relay that is closed when no power is applied to the relay and open when power is applied to the relay.

Other features and advantages of the invention will be apparent in view of the following detailed description and appended drawings.

DETAILED DESCRIPTION OF THE INVENTION

Reference will now be made in detail to various embodiments of the invention. Examples of these embodiments are illustrated in the accompanying drawings. While the invention will be described in conjunction with these embodiments, it will be understood that it is not intended to limit the invention to any embodiment. On the contrary, it is intended to cover alternatives, modifications, and equivalents as may be included within the spirit and scope of the invention as defined by the appended claims. In the following description, numerous specific details are set forth in order to provide a thorough understanding of the various embodiments. However, the present invention may be practiced without some or all of these specific details. In other instances, well known process operations have not been described in detail in order not to unnecessarily obscure the present invention.

An embodiment of the invention will now be described that is configurable to support devices powered by PoE having a −48V return that must be isolated from the ground plane and legacy devices that return −48V current through the ground plane. In the following the term "slot" refers to any structure that physically accepts a module and connects circuits in the module to other circuits in a system.

Figure 1:
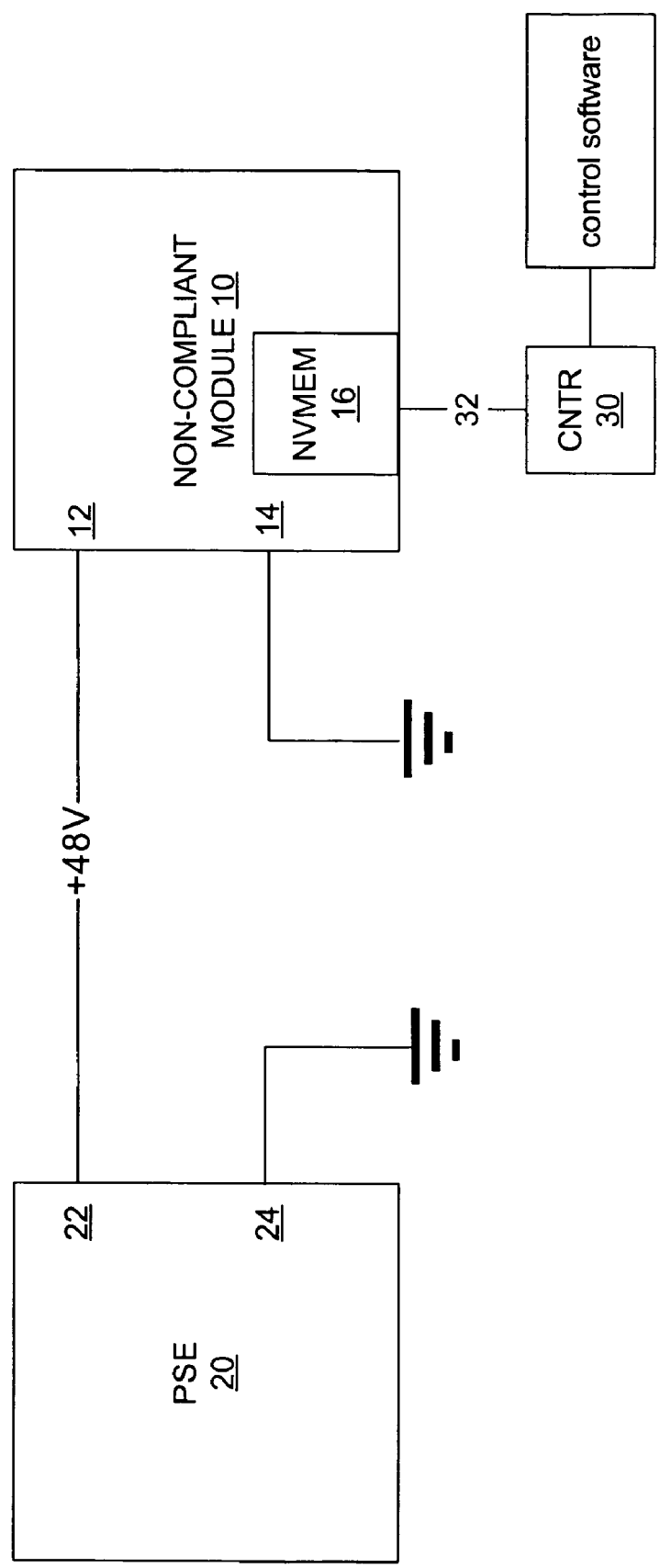
FIG. 1 is a block diagram depicting the connection between a PSE and a non-compliant module.

FIG. 1 is a block diagram of the power and return scheme for a non-compliant module that is not compliant with the isolation requirement of IEEE 802.3af. FIG. 1 depicts a non-compliant module 10 having power and return terminals 12 and 14 and a PSE (power sourcing equipment) 20 having positive and negative terminals 22 and 24.

In FIG. 1 the positive terminal 22 of the PSE 20 is connected to the power terminal 12 of the non-compliant module 10 by a +48V power line and both the negative terminal 24 of the PSE 20 and the return terminal 14 of the non-compliant module 10 are connected to a ground plane.

Also, as depicted in FIG. 1 the non-compliant module 10 includes a non-volatile memory (NVMEM) 16 that holds information about the module including identification information. This module is accessed by a controller 30 through a control bus 32. The identification information is utilized by control software to determine whether the module is compliant with the IEEE 802.3af standard.

Figure 2:
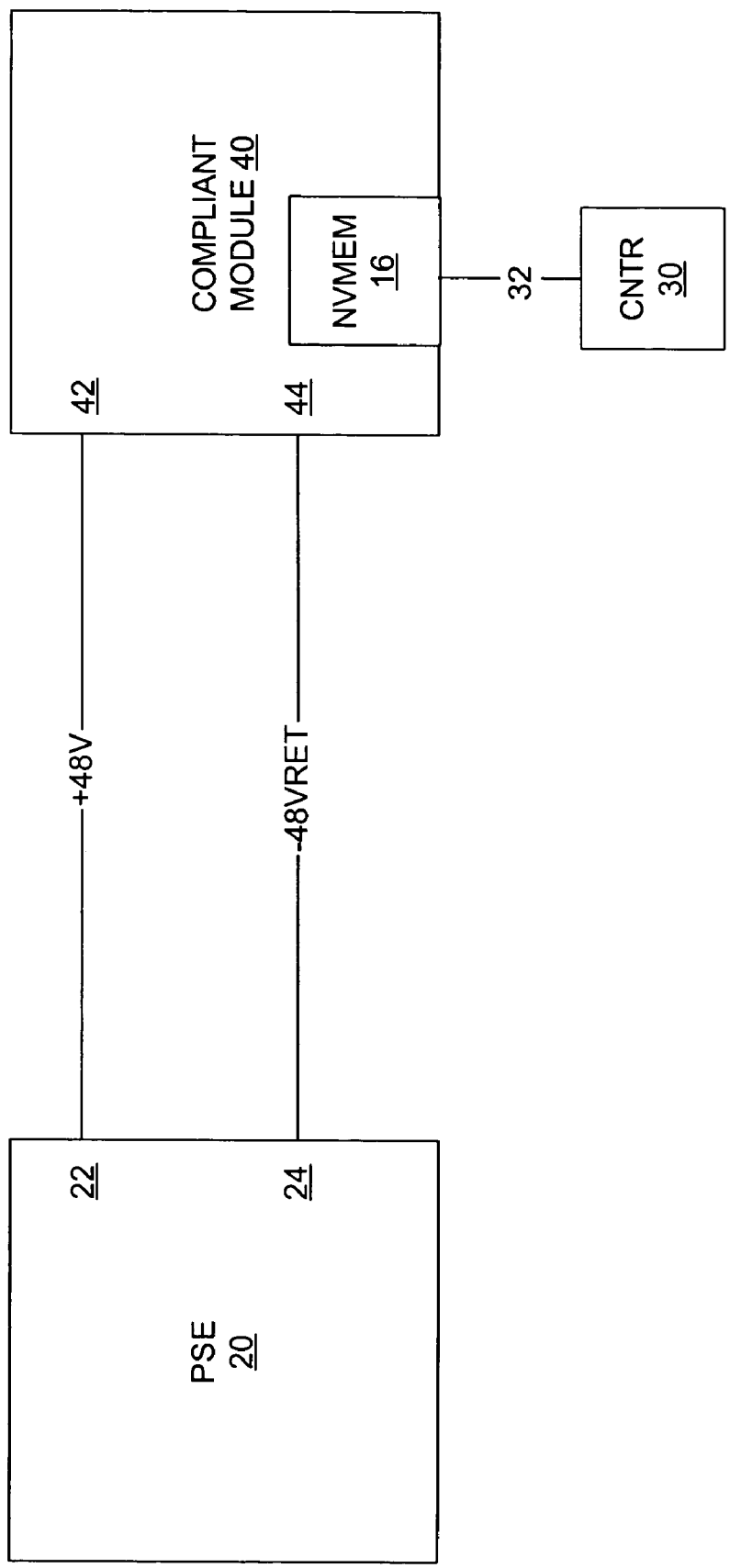
FIG. 2 is a block diagram depicting the connection between a PSE and a compliant module.

FIG. 2 is a block diagram of the power and return scheme for a compliant module that utilizes PoE and is compliant with the isolation requirements of IEEE 802.3af. FIG. 1 depicts a compliant module 40 having power and return terminals 42 and 44 and PSE 20 having positive and negative terminals 22 and 24.

In FIG. 2 the positive terminal 22 of PSE 20 is coupled to the power terminal 42 of the compliant module 40 by the +48V power line and the negative terminal 24 of the PSE is connected to the return terminal 44 of the compliant module 40 by the −48VRET line. The return terminal 44 of the compliant module 40 must be isolated from the ground plane to be compatible with the isolation requirements of IEEE 802.3af. The compliant module 40 also included a NVMEM 16 holding compliance information that can be accessed by the controller 30.

Figure 3:
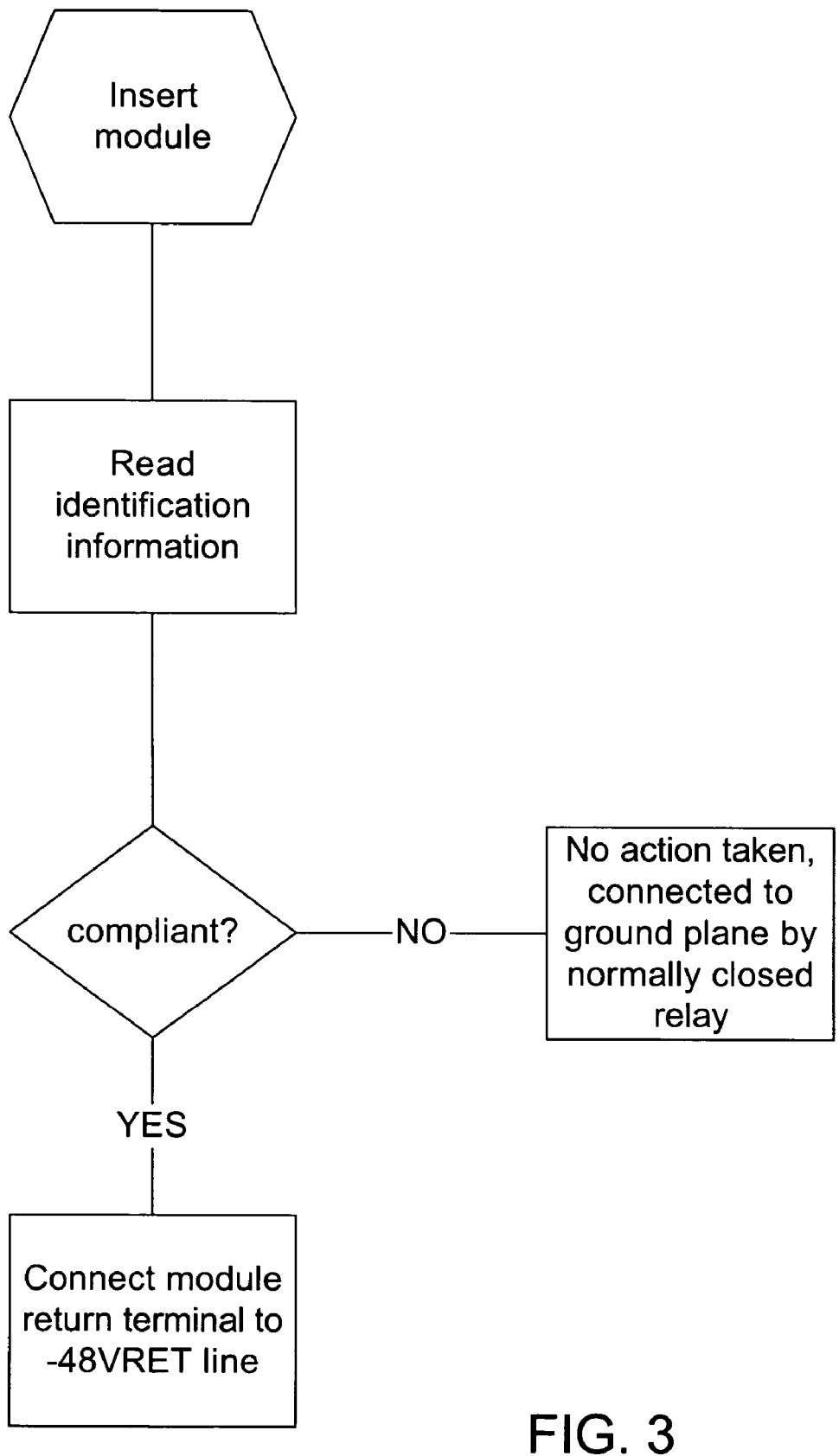
FIG. 3 is a flow chart for implementing an embodiment of the invention.

A technique for configuring a slot to be compatible with either a compliant or non-compliant will now be described with reference to the flow chart of FIG. 3. When a module is inserted into a host platform a controller on the host platform accesses the identification information stored in the NVMEM prior to applying power to the newly inserted module.

If the accessed identification information indicates that the newly inserted module is a compliant module then the return terminal of the newly inserted module is isolated from the ground plane and −48V return current is returned to the PSE utilizing a −48VRET line.

If the accessed identification information indicates that the newly inserted module is a non-compliant module then no action is required because a relay is already configured to connect the return terminal of the newly inserted module to a ground plane and −48V return current is returned to the PSE via the ground plane.

An embodiment of a system for selectively connecting the ground terminal of an inserted module to the −48VRET line or the ground plane will now be described with reference to FIG. 4.

Figure 4:
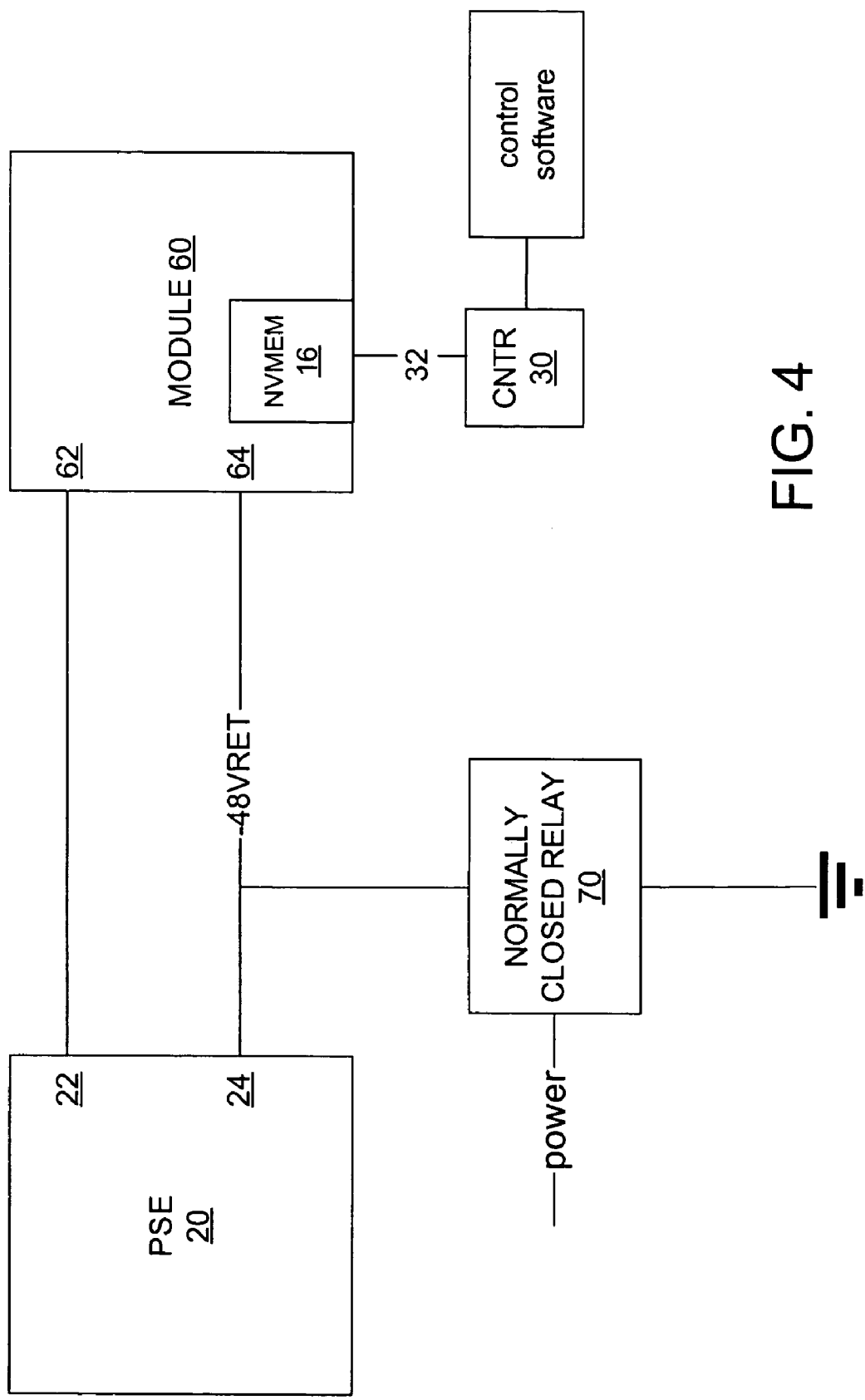
FIG. 4 is block diagram of an embodiment of the invention utilizing a normally closed relay.

In FIG. 4 an inserted module 60 is has its power terminal 62 connected to the positive terminal 22 of the PSE 20 by a +48V power line and has its return terminal 64 coupled to the negative terminal 24 of the PSE 20 by the −48VRET line. The −48VRET line is coupled to the ground plane by a normally closed relay 70.

Figure 5:
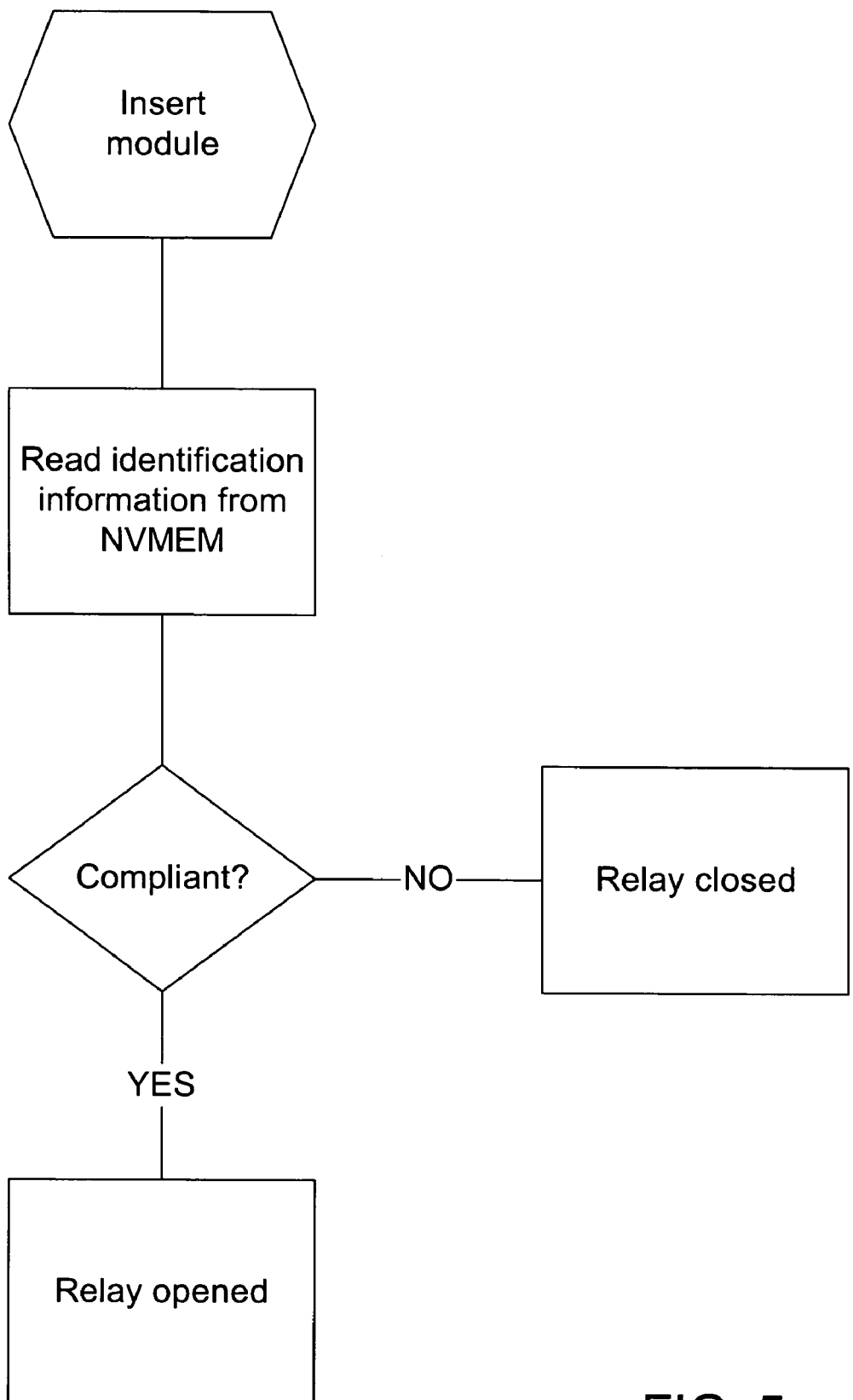
FIG. 5 is a flow chart for implementing an embodiment of the invention.

The operation of the system depicted in FIG. 4 will now be described with reference to the flow chart of FIG. 5. When the module is inserted the identification information in the NVMEM is accessed by the controller to determine whether the inserted module is compliant or non-compliant.

If the module is a compliant module then power is applied to open the relay to isolate the return terminal of the module from the ground plane so that −48V return current is returned to the PSE via the −48VRET line.

If the module is non-compliant power is not applied to the relay so that the −48VRET line remains coupled to the ground plane and −48V return current is returned to the PSE via the ground plane.

Relays may be damaged if current flows through the relay while it is changing state. Accordingly, the system is designed so that when power is off the relay is closed to protect the relay from damage if power to the system is lost or interrupted.

This is because for a compliant module where the relay is normally open current will continue to return via the −48VRET line even if the relay is switched to the closed position due to the higher resistance of the relay compared to the −48VRET line. However, for a non-compliant module, where the relay is normally closed, current would change from flowing through the relay to flowing through −48V return line if relay is switched to the open state.

Accordingly, by utilizing a relay that is normally closed, i.e., is closed when no power is applied, a loss of power will not cause the relay to change state when a non-compliant module is connected.

The invention may be implemented as program code, stored on a computer readable medium, that is executed by a digital computer. The computer readable medium may include, among other things, magnetic media, optical media, electro-magnetic fields encoding digital information, and so on.

The invention has now been described with reference to the preferred embodiments. Alternatives and substitutions will now be apparent to persons of skill in the art. Accordingly, it is not intended to limit the invention except as provided by the appended claims.

What is claimed is:

1. A method comprising:
   determining whether a module inserted into a slot is compliant with the Power over Ethernet (PoE) standard (a compliant module) that requires its return terminal to be coupled to a negative terminal of a power sourcing equipment by a return line or a module that is not compliant with the PoE standard (a non-compliant module) that requires its return terminal to be coupled to the negative terminal of the power sourcing equipment through a ground plane;
   connecting the return terminal of the inserted module to the return line, isolating the return terminal from the ground plane, and using the return terminal to return current to the power sourcing equipment via the return line if the inserted module is a compliant module; and
   connecting the return terminal of the inserted module to the ground plane and using the return terminal to return current to the power sourcing equipment via the ground plane if the inserted module is a non-compliant module.

2. The method of claim 1 where the step of determining further comprises:
   storing identification information on the module; and
   accessing the identification information on the module when the module is inserted into the slot to determine whether it is compliant.

3. The method of claim 2 where said connecting steps comprise:
   connecting the return line to the ground plane by a relay having an open state and a closed state;
   configuring the relay in the open state if accessed compliance information indicates the module is a compliant module; and
   configuring the relay in the closed state if accessed compliance information indicates the module is a non-compliant module.

4. The method of claim 3 with the step of connecting further comprising:
   connecting the return line to the ground line with a relay that is closed when no power is applied and that is open when power is applied to prevent current from flowing through the relay while its state is changing.

5. A system comprising:
   a processor configured to read identification information from a module inserted into the slot to determine whether an inserted module is compliant with the Power over Ethernet (PoE) standard (a compliant module) or a module that is not compliant with the Power over Ethernet (PoE) standard (a non-compliant module);

a return line that couples a return terminal of the module to the negative terminal of a power sourcing equipment;

a relay connected between the return line and a ground plane, with the relay having a closed state and an open state;

with the processor configured to cause the relay to be in the open state when the inserted module is a compliant module to use the return terminal to return current to the power source equipment via the return line and to isolate the compliant module from the ground plane and with the processor configured to cause the relay to be in the closed state when the inserted module is a non-compliant module to use the return terminal to return current to the power sourcing equipment via the ground plane.

6. The system of claim 5 where:

the relay is in the open state when power is applied to the relay and in the closed state when power is not applied to the relay;

and where:

the processor is configured to cause power to be applied to the relay when the inserted module is a compliant module and to cause power not to be applied to the relay when the inserted module is a non-compliant module.

7. A system comprising:

means for determining whether a module inserted into a slot is compliant with the Power over Ethernet (PoE) standard (a compliant module) that requires its return terminal to be coupled to a negative terminal of a power sourcing equipment by a return line or a module that is not compliant with the Power over Ethernet (PoE) standard (a non-compliant module) that requires its return terminal to be coupled to the negative terminal of the power sourcing equipment through a ground plane;

means for connecting the return terminal of the inserted module to the return line to use the return terminal to return current to the power sourcing equipment via the return line and for isolating the return terminal from the ground plane if the inserted module is a compliant module; and means for connecting the return terminal of the inserted module to the ground plane and using the return terminal to return current to the power sourcing equipment via the ground plane if the inserted module is a non-compliant module.

8. The system of claim 7 where the means for determining further comprises:

means for storing identification information on the inserted module; and means for accessing the identification information on the module when the module is inserted into the slot to determine whether the module is compliant.

9. The system of claim 8 where said means for connecting comprise:

means for connecting the return line to the ground plane by a relay having an open state and a closed state;

means for configuring the relay in the open state if accessed compliance information indicates the module is a compliant module; and means for configuring the relay in the closed state if accessed compliance information indicates the module is a non-compliant module.

10. The system of claim 9 further comprising:

a relay that is closed when no power is applied and that is open when power is applied to prevent current from flowing through the relay while its state is changing.

* * * * *